Patented Sept. 25, 1934

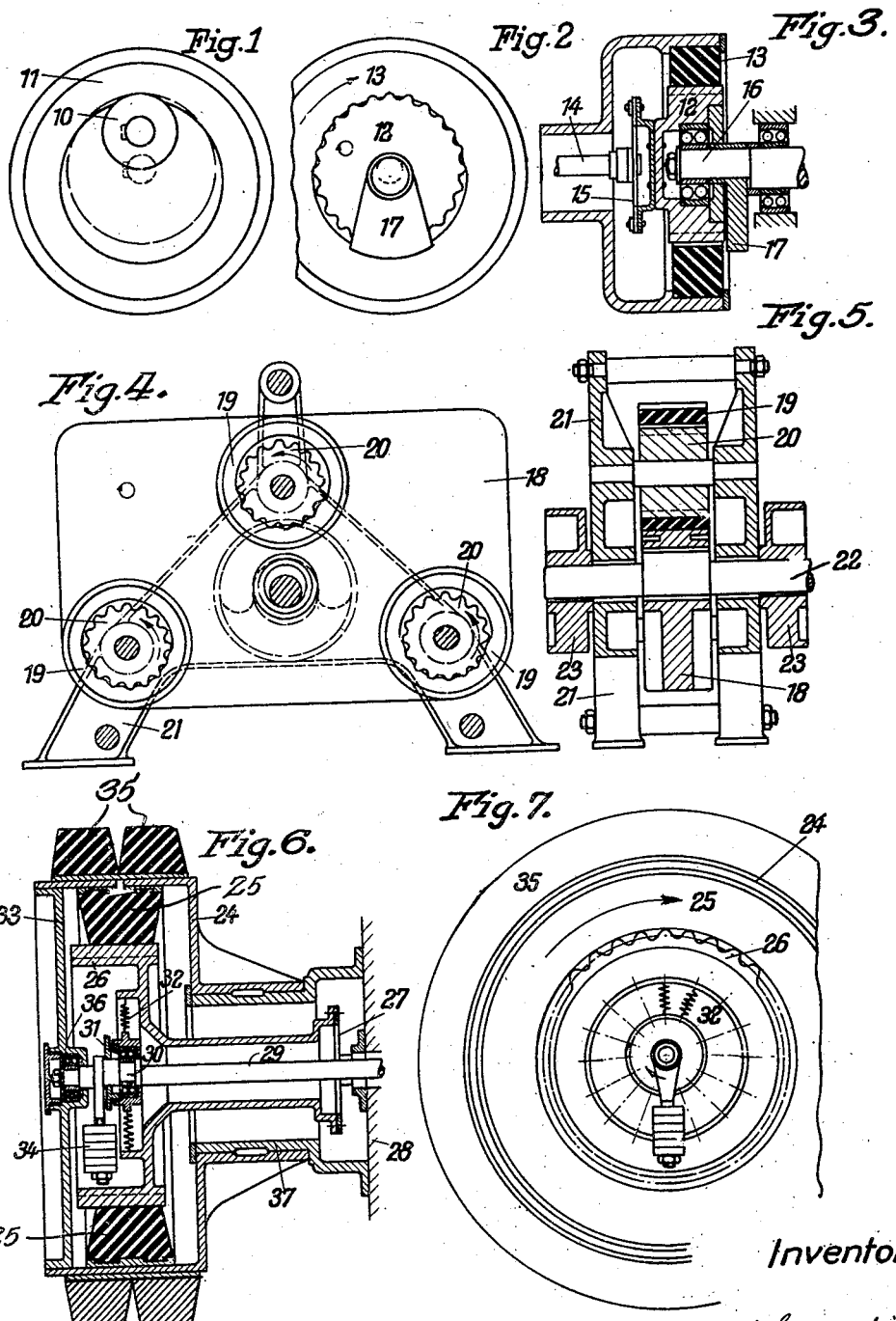

1,974,514

UNITED STATES PATENT OFFICE 1,974,514

DRIVING GEAR WITH AUTOMATICALLY ALTERNATING TRANSMISSION

Georg Heinrich Schieferstein, Berlin-Charlottenburg, Germany

Application June 22, 1931, Serial No. 546,136
In Germany June 26, 1930

12 Claims. (Cl. 74—14)

The object of this invention is the construction of a gear drive with an automatically varying power transmission for the driving of various apparatus, for example, stationary machinery, lifting mechanisms and vehicles. The said gear drive having a rigid gear element with teeth of a wave-like formation and which is in rolling engagement with a second element having a peripheral layer of elastic easily yieldable material.

One of the main advantages of such a gear drive as against known gear drive constructions lies in the fact that a high efficiency is obtained in the power transmission during the varying of speeds from a high speed to a low speed and vice versa and thereby effecting a maximum power output. A further advantage of this drive results from the fact that the drive will adapt itself automatically to the resistance of the load, so that the source of power, as for example a motor, may be driven at that desired constant speed which is most advantageous for its power output regardless of the load resistance.

The invention further contemplates the driving of a plurality of shafts or spindles from a single driving element, the shafts being in any desired position with relation to each other. Furthermore, the plurality of shafts, although driven by a single driving element may be given different rates of speed. Again the driving element may be given any desired form or shape so as to conform to the position of the driven shafts, with the advantageous result that exact driving ratios between the driving element and the driven shafts may be ascertained and may be varied so as to transmit to each driven shaft a different ratio. Obviously a further advantage results thereby, in that the powers transmitted to the driven shafts may be kept constant.

Furthermore, the invention contemplates the construction of a gear drive which is much simpler in construction and operation than the known spur gearing, worm gearing or helical gearing and as compared with known friction drives the gear drive of this invention exhibits a much greater efficiency and serviceability.

A particularly satisfactory performance is obtained with a gear drive in accordance with this invention, if the rigid gear element is arranged to cooperate with the elastic portion of the second element by means of oscillations, the oscillations being produced by the insertion of a loose coupling or freely yielding connection of any desired construction between the oscillation producing means and the rigid gear element, so that rotary oscillations of changeable amplitude are imparted to the gear element. Such a modification of the gear drive makes possible a power transmission at the most advantageous efficiency by use of the resonance principle, whereby the amplitude of the oscillations may be automatically adapted to the damping effect of the system, that is, a gear ratio change of the widest range results, corresponding to the resistance force to be overcome.

A compensation for the oscillation of the mass and a complete freedom from vibration may be attained by the use of a counter weight displaced from the rotating drive element at an angle of 180°, or a second oscillatable system may be arranged at an angle of 180° to the first, so that the second oscillatable system will act as a counterweight to the said driving element.

When it is desired that vehicles carrying a large load shall have an increased pressure between the wheels and the road-bed for the purpose of obtaining a more positive advance, a counterweight can be placed on the drive shaft which will rotate in a circular path of constant radius, so that with an increasing speed of the vehicle, that is, a decreasing advancing resistance of the vehicle, the mass compensation of the gear drive will be equalized, but at an increasing advancing resistance of the vehicle the gear drive will become unequalized. In other words, as the amplitude of the oscillations of the rigid gear element increases, the entire mechanism tends toward equilibrium between the oscillating mass and the mass of the counterweight.

My invention is illustrated in the accompanying drawing in which

Fig. 1 is a diagrammatic front elevational view of a friction drive of known construction;

Fig. 2 is a front elevational view of a gear drive in accordance with the invention;

Fig. 3 is a side view, partly in section and partly in elevation, of the device illustrated in Fig. 2;

Fig. 4 is a front elevational view, partly in section, of a plurality of parallel shafts driven by a single oscillating member;

Fig. 5 is a side view, partly in section, of Fig. 4;

Fig. 6 is a side elevation, partly in section, of a gear drive according to the invention in connection with a freely yielding coupling; and Fig. 7 is a front elevation, partly in section, of the device illustrated in Fig. 6.

In Fig. 1 the reference character 10 designates a drive wheel which is offset from the drive shaft at a given radius by means of an eccentric or crank so as to impart an orbital movement to the drive wheel. The drive wheel 10 in its orbital movement presses against an elastic annular layer 11 of the outer driven wheel so as to set said driven wheel in motion by means of the frictional contact between the two wheels. Such drives are known in the art and have the great disadvantage that the power transmission is comparatively small. When transmission of substantially great peripheral forces is desired, the two wheels must be necessarily brought together at a very great pressure but the slippage between them nevertheless increases greatly with the increase in power to be transmitted. The high cost of manufacture and the poor efficiency of such friction drives practically excludes them from use in transmitting of larger loads.

In contrast to these known friction drives, a drive in accordance with the invention is illustrated in Figs. 2 and 3, in which the driving wheel 12 is in the form of a gear having teeth of wave-like formation and of any desired size. The gear wheel 12 is positioned within a second wheel having an inner contact layer of yieldable material such as rubber or leather. The gear 12 is mounted on an eccentric of a main drive shaft and is connected with a second shaft 14 by means of a yieldable connection such as a leather or rubber disk or a cross-link universal joint 15. The shaft 14 has a tendency to prevent rotation of the gear wheel 12. Rotational oscillations are imparted to the wheel 12 by means of the eccentric 16 and whereby all portions of the gear wheel rotate with the axis of the eccentric in a circular, orbital path of a constant radius. The gear 12 is thereby rotated in such a radius that the teeth of the gear are impressed in the elastic layer 13 and the yieldable material of the layer extends into the spaces between the teeth. In this manner the gear 12 automatically forms in the layer 13 gear teeth corresponding to the teeth of gear 12 and results in a rolling contact without any material amount of slipping. Upon one rotation of the eccentric 16 there is imparted to the gear wheel 12 one orbital rotation or one rotational oscillation, and the outer driven wheel is caused to rotate in the direction of the arrow (see Fig. 2). It can be easily understood that the resulting ratio of gearing depends upon the difference between the circumferences of the driving and driven wheels. The peripheral forces of the wheels are transmitted chiefly through the pressure of the teeth, that is, the pressure between the teeth of the gear and the teeth impressed in the yielding layer. Nevertheless, there is a slight natural peripheral creeping between the wheel surfaces in proportion to the size of the peripheral forces to be transmitted, due to the high elastic characteristics. Therefore in the carrying of varying loads there is an automatic changing of transmission gear ratio.

In order to balance or compensate for the force exerted by the mass by the rotational oscillations, a counterweight 17, arranged at an angle of 180° to the eccentric, may be fixed to the main drive shaft.

According to the modification illustrated by Figs. 4 and 5, a plurality of shafts may be driven from a common driving element. A frame 18 is arranged between two stationary supports 21. Within the frame 18 are fixedly arranged at any desired locations, a plurality of annular yieldable members 19 composed of rubber or the like. A main drive shaft 22 is supported by bearings in the supports 21. An eccentric on said shaft passes through an opening in the frame 18 and is adapted to impart directly to the frame a rotational oscillation of a constant amplitude. Within the yieldable members 19 are mounted toothed gear wheels 20 which are supported by bearings in the supports 21. These gear wheels are in gear with the yieldable members 19 in the same manner as members 12 and 13 in Fig. 2 as above set forth. The yieldable members in this case represent the driving means and the rigid gear wheels, the driven means. The means 19 describe circular oscillations without themselves rotating on their own axes. These circular oscillations impart a rotation to the gear wheels 20, which may further transmit their power in any desired manner. The centrifugal force of the rotationally oscillated mass may be balanced or compensated by mounting counterweights 23 on the main shaft at an angle of 180° to the offset of the eccentric.

The gear ratio between eccentric 22 and the driven gear wheels 20 can naturally be individually varied as desired. Also if it is necessary or desired to have varying outputs in the various gear wheels, this may obviously be accomplished in view of the fact that the gear ratio is proportional to difference between the circumferences of the gear wheels to the yieldable members and also to the pressure exerted between the gear wheels and the yieldable members. The particular location of the various driven shafts is immaterial as well as the shape of the frame 18 as can be readily seen.

According to Figs. 6 and 7 a modification is shown in which the rotary oscillatable driving element imparts a rotation to a yieldable element and the rotary oscillations are imparted to the driving element by means of a freely yielding coupling, whereby rotary oscillations of varying amplitude are produced.

The wheel 24 carrying an inner, annular, yieldable layer 25, may represent the drive wheel of a tractor or other self-impelled vehicle. The outer surface of the wheel 24 is equipped with a rubber tire 35. Obviously such driven wheels can be utilized in any other desired apparatus. The wheel 24 is rotatably carried by a fixed hollow shaft 37. Within the yieldable layer 25 there is mounted a toothed drive wheel 26. This drive wheel is connected to the fixed frame of the vehicle by means of a universal joint 27, in such a manner that it may carry out rotational oscillations within the layer 25 but at the same time is unable to rotate about its own axis. The drive shaft 29 is provided with an eccentric 30 and is centrally and rotatably supported in the cover plate 33 of the wheel. The eccentric is surrounded by a bearing 31. The bearing is in turn connected to the drive wheel 26 by elastic means, for example springs, rubber elements or the like, so that the eccentric together with the yieldable elements 32, will function as a freely yielding or loose coupling and the wheel 26 will have imparted to it rotary oscillations of varying amplitude.

When the shaft 29 is set into motion, the wheel 26 begins to rock and finally assumes a rotary oscillation of a variable amplitude. This amplitude changes according to a given driving output and the damping effect of the work performing wheel 24. The toothed wheel 26 will rock on the yieldable layer until the energy being transmitted to the layer 25 by the wheel 26 is equal to the energy transmitted to the wheel 26 through the freely yielding coupling. The teeth of wheel 26 will be pressed into the yieldable layer in proportion to the amplitude of the rotary oscillations imparted to 26. Therefore at a decreasing load, wheel 26 will roll on the layer 25 in an orbital path of increasing radius whereby the rotational speed of the wheel 24 will be increased and at an increasing load the radius of the orbital path will be decreasing. It can be easily seen that there is an automatic adjustment of the transmission gear ratio in accordance with the resistance to be overcome in the driven members due to the slippage being in proportion to the depth of the impression of the teeth formed by the gear wheel 26 on the elastic layer by deflection thereof which is proportional to the varying amplitude of the oscillations of the said gear wheel.

In order to balance the centrifugal force of the mass due to the rotary oscillations, counterweights may be utilized as stated in the above examples.

According to Figs. 6 and 7 the balancing counterweight 34 is connected to the main shaft 29 by means of a rigid rod, so that the balancing mass may rotate with a constant radius. In this manner entirely novel results are forthcoming which are particularly advantageous in power driven vehicles and pulling apparatus.

The weight of the mass 34 is so chosen that by the smallest damping effect of the oscillatable system, that is at the greatest speed of the vehicle, the balancing of the centrifugal force of the mass is almost accomplished. When the resistance to the movement of the vehicle increases, the stroke of the gear wheel becomes smaller, and a part of the centrifugal force of the mass 34 will be increasingly transmitted to the wheel 24 through the bearing 36 and the cover support 33. The wheel 24 receives therefore through the periodical centrifugal force of the mass 34 a higher pressure on its base support so that its pulling power becomes greater and the increased load resistance is overcome. The increased adhesion power of the wheels, obtained in this manner, is especially advantageous in increasing the efficiency of pulling apparatus; a much greater pulling efficiency is obtained in apparatus of the same weight.

It is within the scope of the invention to change the details of the individual parts as long as the combination functions in the manner described. For example, instead of having teeth on the outer periphery of the rigid gear wheel, teeth may be arranged on the inner periphery of such a drive wheel, or one of the driving elements may be in the form of a rack and pinion or the elements may be of elliptical form. It is also within the scope of the invention to construct the novel drive in the form of a bevel gearing or to make either the elastic member or the rigid member the driving element. The loose coupling or freely yielding coupling may be of any desired construction so long as the function remains the same. Again the rigid member may describe rotary oscillations without revolving and the elastic member may have a rotational movement or vice versa. Therefore, it is desired that the invention should only be limited by scope of the claims.

For the increasing of the slippage of the drive the wheels may be immersed in water, glycerine, castor oil, or such other lubricants as will have no detrimental action on the elastic layer.

What I claim is:

1. A gear drive mechanism having an automatically variable transmission gear ratio which comprises a rigid, toothed member and a cooperating member having a yieldable layer in rolling contact with the teeth of said toothed member and means for imparting rotary oscillations to one of said members in which the unbalanced rotary force of the rotary oscillating mass is balanced by a rotary mass eccentrically arranged on the axis of the said oscillating mass with a phase displacement of 180 degrees relative to the oscillating mass.

2. A gear drive mechanism having an automatically variable transmission gear ratio which comprises a rigid, toothed member and a cooperating member having a yieldable layer in rolling contact with the teeth of said toothed member, and means for imparting a rotational movement to the toothed member and an orbital rotational oscillatory movement to the yielding member so that all points of the last-mentioned member move in circular path without rotating upon its own axis.

3. A gear drive as defined by claim 2 in which the oscillating member is connected to and imparts rotation to a plurality of driven members.

4. A gear drive mechanism having an automatically variable transmission gear ratio which comprises a rigid, toothed member and a cooperating member having a yieldable layer in rolling contact with the teeth of said toothed member and means for imparting rotary oscillations to one of said members in which oscillations are imparted to the oscillating member by means of an eccentric or crank shaft having a constant stroke.

5. A gear drive mechanism having an automatically variable transmission gear ratio which comprises a rigid, toothed member and a cooperating member having a yieldable layer in rolling contact with the teeth of said toothed member, an orbitally moving element and a freely yielding connection between the element having said orbital movement and one of said gear drive members for imparting rotary oscillations of variable amplitude to said gear member.

6. A gear drive mechanism having an automatically variable transmission gear ratio which comprises, a plurality of rigid toothed members and a corresponding number of cooperating members provided with yieldable layers in rolling contact with the teeth of said toothed members, means for rigidly connecting one of said sets of plurality of members and imparting a rotary, oscillatory motion thereto.

7. A gear drive mechanism having an automatically variable transmission gear ratio as defined by claim 6 in which the rigid toothed members and their corresponding yieldable layered members have varying gear ratios.

8. A gear drive mechanism having an automatically variable transmission gear ratio, which comprises a rigid, toothed member and a cooperating member having a yieldable layer in rolling contact with the teeth of said toothed member and means for imparting rotary oscillations to one of said members including elastic means connected to an eccentric or crank shaft having a constant stroke.

9. A gear drive as defined by claim 5 in which the unbalanced rotary force of the rotary oscillating gear member is balanced by a rotary mass eccentrically on the axis about which the oscillating gear member rotates, in such a manner that during the operation the phase displacement of the rotary balancing mass is 180° relative to the said oscillating gear member.

10. A gear drive as defined by claim 5 in which the unbalanced rotary force of the rotary oscillating gear member is balanced by a rotary mass eccentrically arranged on the axis about which the oscillating gear member rotates, in such a manner that during the operation the phase displacement of the rotary balancing mass is 180° relative to the oscillating gear member, the weight of said rotary balancing mass being such that the balancing gradually becomes complete at an increasing percentage of energy transmission.

11. A gear drive as defined by claim 5 in which the unbalanced rotary force of the rotary oscillating gear member is balanced by a rotary mass eccentrically arranged on the axis about which the oscillating gear member rotates, in such a manner that during the operation the phase displacement of the rotary balancing mass is 180° relative to the oscillating gear member, the weight of said rotary balancing mass being such that the balancing gradually becomes complete at an increasing percentage of energy transmission, the vibrations produced in case of incomplete balance of inertia being utilized for improving the energy transmission.

12. In a gear drive mechanism having an automatic variable transmission gear ratio, an oscillatory system comprising a driving member and a driven member, loose coupling means for imparting oscillations to said system, the amplitude of said oscillations varying in inverse proportion to the load on said driven member, one of said members having a rigid toothed construction, the other of said members having a layer of yieldable material in rolling contact with the teeth of said toothed member, and means to produce indentations of variable depth in the yieldable member proportional to the resistance of the driven member.

GEORG HEINRICH SCHIEFERSTEIN.